(12) United States Patent
Sana (10) Patent No.: US 12,485,628 B2
(45) Date of Patent: Dec. 2, 2025

(54) COMPOSITE MATERIAL STRUCTURE MANUFACTURING JIG, METHOD OF MANUFACTURING THE SAME, AND METHOD OF MANUFACTURING COMPOSITE MATERIAL STRUCTURE

(71) Applicant: Kawasaki Jukogyo Kabushiki Kaisha, Kobe (JP)

(72) Inventor: Toshikazu Sana, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 61 days.

(21) Appl. No.: 18/539,297

(22) Filed: Dec. 14, 2023

(65) Prior Publication Data

US 2024/0109260 A1  Apr. 4, 2024

Related U.S. Application Data

(62) Division of application No. 17/423,494, filed as application No. PCT/JP2020/001516 on Jan. 17, 2020, now Pat. No. 11,890,823.

(Continued)

(51) Int. Cl.
*B29C 70/34* (2006.01)
*B29C 33/62* (2006.01)
(Continued)

(52) U.S. Cl.
CPC ............ *B29C 70/345* (2013.01); *B29C 33/62* (2013.01); *B29C 70/54* (2013.01); *B29K 2105/0872* (2013.01); *B29L 2031/3082* (2013.01)

(58) Field of Classification Search
CPC ..... B29C 70/462; B29C 70/549; B29C 70/44; B29C 70/446
See application file for complete search history.

(56) References Cited

U.S. PATENT DOCUMENTS 3,177,105 A * 4/1965 Wiltshire ............. B29C 70/342
156/218
3,377,657 A * 4/1968 Richardson ........... B29C 70/446
249/141

(Continued)

FOREIGN PATENT DOCUMENTS

JP    2009-179001 A    8/2009
JP    2011-235635 A    11/2011
WO   2011/033741 A1    3/2011

*Primary Examiner* — Matthew J Daniels
(74) *Attorney, Agent, or Firm* — XSENSUS LLP (57) ABSTRACT

A composite material structure manufacturing jig is used when manufacturing a composite material structure by adhering prepreg to a framework structure including a frame component that includes a channel extending along a longitudinal direction of the frame component. The composite material structure manufacturing jig is inserted in the channel of the frame component and used therein. The jig includes a tubular body formed of an elastic material containing a reinforcement fiber, the body including a trapezoidal transverse section that is a cross section orthogonal to a longitudinal direction of the body, the trapezoidal transverse section including an upper base and a lower base longer than the upper base. An inner surface of the body is coated with an inner peripheral film serving as a gas barrier layer.

7 Claims, 6 Drawing Sheets

Related U.S. Application Data (60) Provisional application No. 62/793,459, filed on Jan. 17, 2019.

(51) Int. Cl.
*B29C 70/54* (2006.01)
*B29K 105/08* (2006.01)
*B29L 31/30* (2006.01)

(56) References Cited

U.S. PATENT DOCUMENTS

| | | | | |
|---|---|---|---|---|
| 3,937,781 A * | 2/1976 | Allen | ................ | B29C 70/443 |
| | | | | 264/269 |
| 5,259,901 A | 11/1993 | Davis et al. | | |
| 5,314,653 A | 5/1994 | Haralambopoulos | | |
| 5,387,098 A | 2/1995 | Willden | | |
| 5,454,895 A * | 10/1995 | Imparato | ................ | B29C 70/342 |
| | | | | 425/389 |
| 5,484,277 A * | 1/1996 | Lindsay | ................ | B29D 99/0014 |
| | | | | 264/316 |
| 7,530,530 B2 * | 5/2009 | Engwall | ................ | B29D 99/0014 |
| | | | | 244/119 |
| 7,824,171 B2 * | 11/2010 | Hanson | ................ | B29C 33/505 |
| | | | | 425/389 |
| 8,043,554 B2 * | 10/2011 | Yip | ................ | B29C 70/342 |
| | | | | 264/258 |
| 8,419,402 B2 * | 4/2013 | Guzman | ................ | B29D 99/0003 |
| | | | | 264/156 |
| 8,778,117 B2 * | 7/2014 | Dorawa | ................ | B29C 70/543 |
| | | | | 156/245 |
| 8,926,313 B2 | 1/2015 | Sana et al. | | |
| 2003/0151171 A1 * | 8/2003 | LeBreton | ................ | B29C 70/446 |
| | | | | 264/102 |
| 2005/0230552 A1 | 10/2005 | Engwall et al. | | |
| 2008/0283668 A1 * | 11/2008 | Martinez Cerezo | ................ | |
| | | | | B29D 99/0014 |
| | | | | 244/133 |
| 2008/0302912 A1 * | 12/2008 | Yip | ................ | B29C 70/446 |
| | | | | 244/119 |
| 2010/0009124 A1 * | 1/2010 | Robins | ................ | B29C 33/405 |
| | | | | 156/185 |
| 2010/0139850 A1 * | 6/2010 | Morris | ................ | B29D 99/001 |
| | | | | 156/500 |
| 2010/0139857 A1 * | 6/2010 | Pham | ................ | B29C 33/505 |
| | | | | 425/389 |
| 2011/0277918 A1 * | 11/2011 | Lee | ................ | B29C 33/505 |
| | | | | 156/580 |
| 2012/0097323 A1 * | 4/2012 | Nitsch | ................ | B29C 70/30 |
| | | | | 156/212 |
| 2012/0219660 A1 | 8/2012 | Sana et al. | | |
| 2013/0175731 A1 * | 7/2013 | Doddman | ................ | F02C 7/04 |
| | | | | 264/250 |
| 2015/0343715 A1 * | 12/2015 | Cruzado Parla | ... | B29D 99/0014 |
| | | | | 264/571 |
| 2016/0339682 A1 | 11/2016 | Bahe et al. | | |
| 2017/0043510 A1 | 2/2017 | Heath et al. | | |
| 2017/0120481 A1 | 5/2017 | Ingram, Jr. et al. | | |
| 2017/0136687 A1 | 5/2017 | Heath et al. | | |
| 2017/0173863 A1 | 6/2017 | Neo et al. | | |

\* cited by examiner

COMPOSITE MATERIAL STRUCTURE MANUFACTURING JIG, METHOD OF MANUFACTURING THE SAME, AND METHOD OF MANUFACTURING COMPOSITE MATERIAL STRUCTURE

CROSS-REFERENCE TO RELATED APPLICATIONS

The present application is a divisional of U.S. patent application Ser. No. 17/423,494, filed Jul. 16, 2021, which is based on PCT filing PCT/JP2020/001516, filed Jan. 17, 2020, which claims priority to U.S. Patent Application No. 62/793,459, filed Jan. 17, 2019, the entire contents of each are incorporated herein by reference.

TECHNICAL FIELD

The present application relates to a jig for use in manufacturing a composite material structure, a method of manufacturing the jig, and a method of manufacturing the composite material structure. The present application particularly relates to: an inflatable bag-shaped jig (a bladder) that is used, in the manufacturing of a structure in which a frame component including a channel is used, as a jig for the frame component; a method of manufacturing the jig; and a method of manufacturing a composite material structure by using the jig.

BACKGROUND

In recent years, the use of fiber-reinforced resin composite materials (which may hereinafter be simply referred to as "composite materials" as necessary) has become widespread in the fields in which metal materials have been used. Among the composite materials, carbon fiber reinforced materials that are formed by impregnating carbon fibers serving as reinforcement fibers with a matrix resin such as epoxy resin (or with a resin composition) are lighter and stronger than metal materials. For this reason, carbon fiber reinforced materials are widely adopted in the fields of, for example, sports equipment, industrial machines, and aerospace.

In the field of aerospace, for example, even in large structures such as an aircraft fuselage and aircraft blades, components made of composite materials have started being used instead of those made of metal materials. For example, an aircraft fuselage panel made of a composite material usually includes a skin and stringers. The stringers are each supported by a panel-manufacturing jig and are arranged to conform to the shape of the structure. Prepreg that is to form the skin is laminated on each stringer, which is then pressurized and heated in an autoclave. As a result, the prepreg is cured to form the skin, and the stringer is closely adhered to and integrated with the skin.

There are various types of stringers serving as reinforcing components. These stringers are categorized into different types mainly depending on their sectional shape. Specifically, flat plate-shaped, rectangular columnar, C-shaped, I-shaped, L-shaped, Z-shaped, and hat-shaped (or Ω-shaped) stringers are known. Among these, hat-shaped stringers (hereinafter, "hat stringers") have been often used as reinforcing components in recent years, because hat stringers have favorable followability to the skin.

In the case of manufacturing a composite material panel by using a hat stringer, a hollow jig called bladder, which is made of rubber (or elastomer), is adopted. (The bladder is a mold made of an elastic material.) The bladder is placed inside the hat stringer. The bladder is configured such that it can be pressurized from the inside of the hat stringer during the autoclaving. After the prepreg is cured into the skin by the autoclaving, the bladder can be pulled out and removed from the inside of the hat stringer, and thus demolding can be performed.

Representative examples of the bladder include those disclosed by Patent Literature 1, Patent Literature 2, and Patent Literature 3. Among these, Patent Literature 3 discloses a technique in which an inner bag that is constituted by a flexible film tube is placed around the outer periphery of a bladder (in Patent Literature 3, the outer periphery of a mandrel). The inner bag is used to apply autoclave pressure to the bladder inside a hat stringer. Patent Literature 3 also describes that at the time of pulling out and removing the bladder, a lubricant may be used to allow the bladder to slide over the surface of the inner bag.

CITATION LIST

Patent Literature

PTL 1: U.S. Pat. No. 8,926,313
PTL 2: U.S. Patent Application Publication No. 2016/0339682
PTL 3: U.S. Patent Application Publication No. 2017/0136687

SUMMARY

A composite material structure manufacturing jig according to the present application is used when manufacturing a composite material structure by adhering prepreg to a framework structure including a frame component that includes a channel extending along a longitudinal direction of the frame component. The composite material structure manufacturing jig is inserted in the channel of the frame component and used therein. The composite material structure manufacturing jig includes a tubular body formed of an elastic material containing a reinforcement fiber, the body including a trapezoidal transverse section that is a cross section orthogonal to a longitudinal direction of the body, the trapezoidal transverse section including an upper base and a lower base longer than the upper base. An inner surface of the body is coated with a gas barrier layer.

A method of manufacturing a composite material structure manufacturing jig according to the present application is a method of manufacturing the above-described composite material structure manufacturing jig, the method using a mold and a core, the mold including a cavity corresponding to the body, the core being placed in the cavity and having a shape corresponding to an internal space of the body. The method includes: placing the core, the reinforcement fiber, and the elastic material in the cavity such that the reinforcement fiber and the elastic material are disposed around the core, the reinforcement fiber either including a slit therein that extends along the longitudinal direction of the body or being sandwiched between pieces of the elastic material; placing a film on an outer peripheral surface of the core such that the film is wound around the outer peripheral surface of the core, the film serving as a gas barrier layer; heating and melting the elastic material to impregnate the elastic material into the reinforcement fiber to mold the body; and then pulling out and removing the core from the body.

The present application also encompasses a method of manufacturing a composite material structure by using the above-described composite material structure manufacturing jig. Specifically, the method of manufacturing a composite material structure according to the present application may be a method of manufacturing a composite material structure in which a frame component including a channel is used, the method including: placing the frame component on an outer peripheral surface of a mold; inserting the above-described composite material structure manufacturing jig into the channel of the frame component; laminating prepreg on the composite material structure manufacturing jig and the frame component; and heating the prepreg to cure the prepreg.

The above object, other objects, features, and advantages of the present application will be made clear by the following detailed description of preferred embodiments with reference to the accompanying drawings.

DESCRIPTION OF EMBODIMENTS

Hereinafter, an exemplary embodiment of the present disclosure is described with reference to the drawings. In the drawings, the same or corresponding elements are denoted by the same reference signs, and repeating the same descriptions is avoided below.

[Composite Material Structure Manufacturing Jig (Bladder)]

First, a specific configuration example of a bladder that is one exemplary example of a composite material structure manufacturing jig according to the present disclosure is described with reference to FIG. 1A, FIG. 1B, and FIG. 2A to FIG. 2C. In the description below, the lengthwise direction of the bladder is referred to as "longitudinal direction," and a direction orthogonal to the longitudinal direction is referred to as "transverse direction." Also, a section of the bladder in the longitudinal direction is referred to as "longitudinal section," and a section of the bladder in the transverse direction is referred to as "transverse section."

Figure 1A:
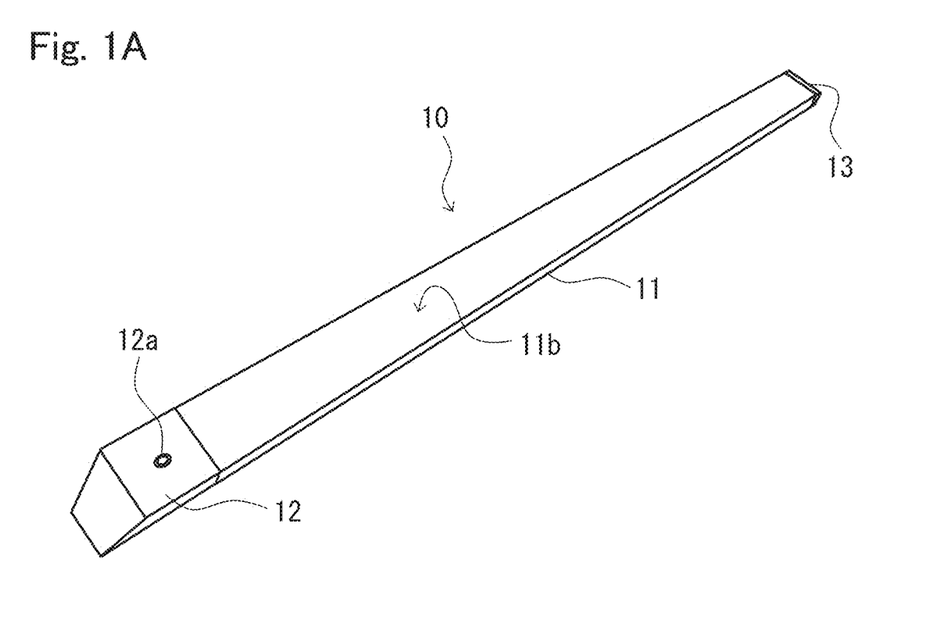
FIG. 1A and FIG. 1B are perspective views each showing the configuration of a bladder as a composite material structure manufacturing jig according to an exemplary embodiment of the present disclosure.
Figure 1B:
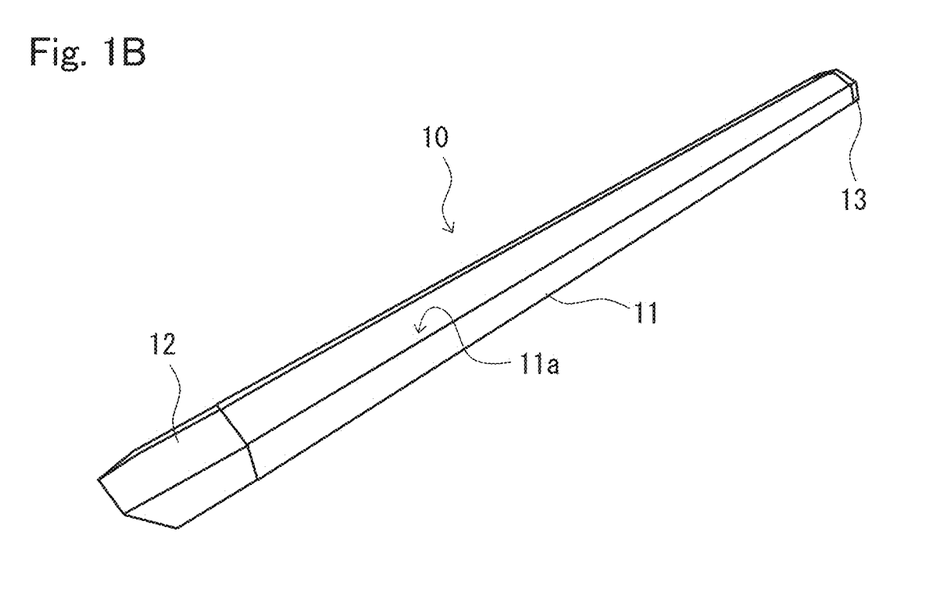

As shown in a perspective view of FIG. 1A and a perspective view of FIG. 1B, the overall external shape of a bladder 10 according to the exemplary embodiment is a pillar-like shape. The bladder 10 includes at least a body 11, a terminal metal fitting 12, and a terminal plug 13. The body 11 is the main part of the bladder 10, and the inside of the body 11 is hollow and tubular as shown in a longitudinal sectional view of FIG. 2A and an end portion perspective view of FIG. 2B.

Figure 2A:
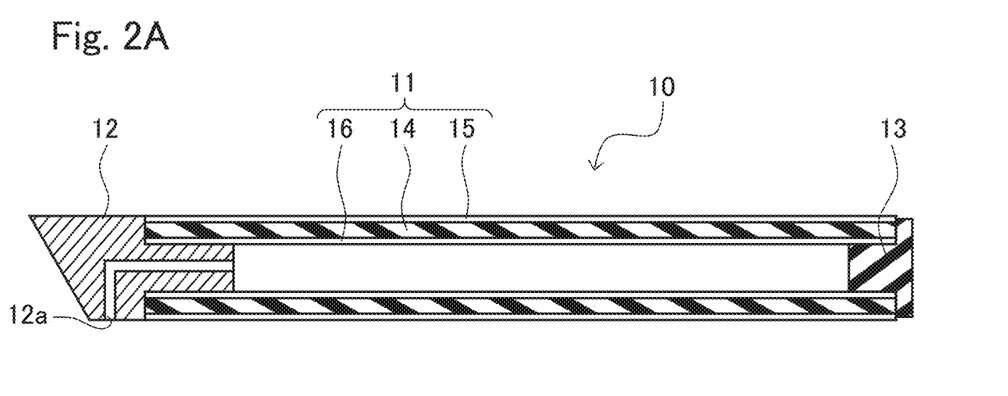
FIG. 2A is a schematic sectional view showing a longitudinal section of the bladder shown in FIG. 1.
Figure 2B:
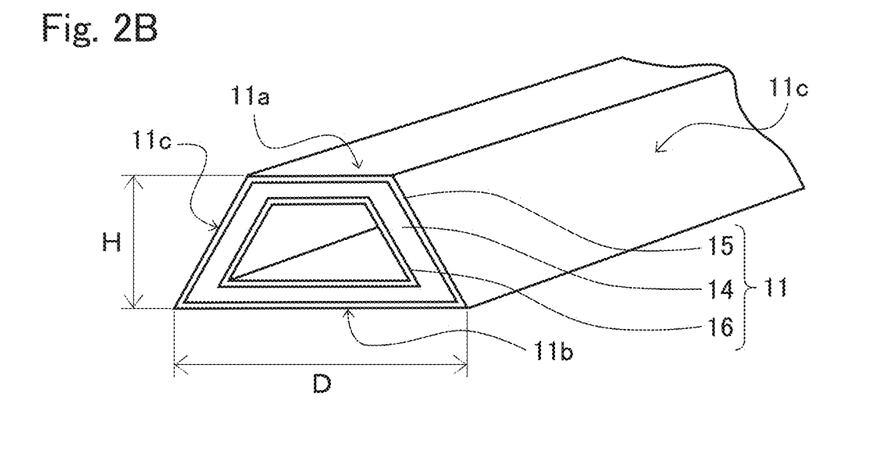
FIG. 2B is a partial perspective view showing one end of the body of the bladder shown in FIG. 1.
Figure 2C:
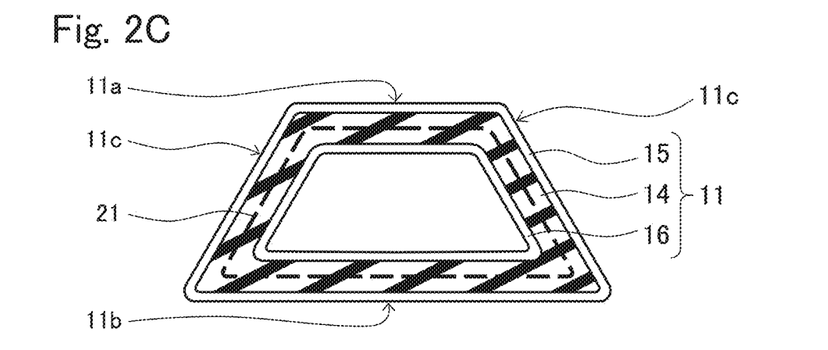
FIG. 2C is a schematic sectional view showing a cross section in a direction orthogonal to the longitudinal direction of the bladder shown in FIG. 1.

As shown in FIG. 2B and a transverse sectional view of FIG. 2C, the transverse section of the body 11 has a trapezoidal shape including an upper base and a lower base longer than the upper base. The reason for this is that, as described below, the bladder 10 needs to have a shape that is insertable into a channel formed in a hat stringer. A wall 11a of the body 11 corresponds to the upper base of the trapezoidal transverse section, and the outer surface of the wall 11a is a surface that comes into contact with the channel of the hat stringer. Therefore, in the exemplary embodiment, the wall 11a as shown in FIG. 1B and FIG. 2B is referred to as "contact wall 11a."

A wall 11b of the body 11 corresponds to the lower base of the trapezoidal transverse section, and the outer surface of the wall 11b is a surface that is exposed in a state where the bladder 10 is inserted in the channel of the hat stringer. Therefore, in the exemplary embodiment, the wall 11b as shown in FIG. 1A and FIG. 2B is referred to as "exposed wall 11b." Accordingly, FIG. 1A is a perspective view when the exposed wall 11b faces upward, and FIG. 1B is a perspective view when the contact wall 11a faces upward. Of course, the contact wall 11a (the wall corresponding to the upper base) and the exposed wall 11b (the wall corresponding to the lower base), which are positioned opposite from each other, are parallel to each other. It goes without saying that the frame component used in the present disclosure is not limited to a hat stringer. Known various frame components are applicable, so long as each of these various frame components includes a channel.

As shown in FIG. 2B and FIG. 2C, in the exemplary embodiment, the transverse section of the body 11 has a trapezoidal shape that is symmetrical with respect to a line passing through the center point of the upper base and the center point of the lower base, i.e., an isosceles trapezoidal shape. Accordingly, in a case where the walls of the body 11 corresponding to the respective oblique sides of the trapezoidal transverse section are defined as inclined walls 11c, respectively, the inclined walls 11c are inclined in opposite directions with the same inclination angle. Similar to the contact wall 11a, the outer surfaces of the respective inclined walls 11c also come into contact with the channel of the hat stringer.

In the exemplary embodiment, the height of the trapezoidal transverse section is referred to as a height H, and the length of the lower base of the trapezoidal transverse section (i.e., the width of the exposed wall 11b) is referred to as a length D. In the exemplary embodiment, the transverse section of the body 11 has, but is not limited to, an isosceles trapezoidal shape. If the transverse section of the channel of the hat stringer has a non-isosceles trapezoidal shape, the transverse section of the body 11 may have a trapezoidal shape conforming to the non-isosceles trapezoidal shape.

As shown in FIG. 2A and FIG. 2B, the body 11 has a tubular shape. Both ends of the body 11 are sealed by the terminal metal fitting 12 and the terminal plug 13, and thereby the inside of the body 11 is made air-tight. As shown in FIG. 2A to FIG. 2C, the body 11 includes, at least, a tubular portion 14, an outer peripheral film 15, and an inner peripheral film 16. The tubular portion 14 is formed of an elastic material and a fiber-reinforced material 21. The outer peripheral surface of the tubular portion 14 is coated with the outer peripheral film 15. The inner peripheral surface of the tubular portion 14 is coated with the inner peripheral film 16. The body 11, excluding its surface layers that are the outer peripheral film 15 and the inner peripheral film 16, can be regarded as being substantially comprised of the tubular portion 14. Therefore, the above-described contact wall 11a, exposed wall 11b, and inclined walls 11c, which serve as the walls of the body 11, also serve as the walls of the tubular portion 14.

The tubular portion 14 is the "main portion" of the body 11. Therefore, as described below, when the inside of the body 11 is pressurized by autoclaving, the tubular portion 14 formed by using an elastic material is inflated. The fiber-reinforced material 21 is schematically shown by thick dashed line in FIG. 2C, and the illustration of the fiber-reinforced material 21 is omitted in FIG. 2A for the sake of convenience of illustration. The fiber-reinforced material 21 does not interfere with the inflation of the tubular portion 14. The outer peripheral film 15 with which to coat the outer peripheral surface of the tubular portion 14, and the inner peripheral film 16 with which to coat the inner peripheral surface of the tubular portion, are also stretchable in accordance with the inflation of the tubular portion 14. Therefore, the overall body 11 is inflated when the inside of the body 11 is pressurized. A specific shape and dimensions of the transverse section of the body 11, specific configurations of the tubular portion 14, the outer peripheral film 15, and the inner peripheral film 16, etc., will be described below.

The overall length of the body 11 is not particularly limited. As described below, the bladder 10 according to the exemplary embodiment is used as a jig for manufacturing a composite material structure, and is inserted into the channel of each of the frame components (e.g., hat stringers) of the composite material structure. Therefore, the body 11 is designed to have various lengths. For example, in a case where the composite material structure is an aircraft fuselage formed as one piece barrel (OPB) and the frame components are hat stringers, the frame components have various lengths within a predetermined range (e.g., within the range of 1 to 14 m). Therefore, the length of the body 11 may be set to fall within the predetermined range.

The terminal metal fitting 12 is a component that seals one end portion of the body 11. As shown in FIG. 1A and FIG. 2A, the terminal metal fitting 12 is provided with a pressurization hole 12a formed therein. In the exemplary embodiment, as shown in FIG. 2A, the terminal metal fitting 12 includes at least an insert and a head. The insert is to be inserted into the hollow space of the body 11. The head is connected to the insert. In a state where the insert is inserted in the body 11, the insert is closely adhered to the inner surface of the body 11 by an adhesive, but the head is exposed to the outside.

The insert may have a shape that conforms to the shape of the hollow space of the body 11. In the exemplary embodiment, as shown in FIG. 2B or FIG. 2C, each of the walls of the body 11 has substantially the same thickness. Accordingly, the transverse sectional shape of the hollow space is also trapezoidal. Therefore, the insert is a short pillar-shaped portion whose transverse sectional shape is trapezoidal. The length of the insert is not particularly limited. The insert may have such a length that in a state where the insert is inserted in the hollow space of the body 11 and adhered to the inner surface of the body 11 by the adhesive, the length ensures a sufficient adhesion area so that the inside of the body 11 can be kept air-tight.

The head of the terminal metal fitting 12 may have a shape whose dimensions are sufficiently greater than the dimensions of the hollow space of the body 11 so that the head of the terminal metal fitting 12 can be assuredly exposed to the outside of the body 11. As described below, preferably, the transverse section of the head of the terminal metal fitting 12 has substantially the same dimensions as the contour dimensions of the body 11 to facilitate the inserting of the bladder 10 into the channel of the hat stringer. If the transverse section of the head and the transverse section of the body 11 are substantially equal in size to each other, then over the entire bladder 10, the outer surface of each wall forms a substantially single flat surface. This allows the bladder 10 to be inserted into, or pulled out and removed from, the channel more easily.

Further, in the exemplary embodiment, the outer end of the head of the terminal metal fitting 12 is not flat, but protrudes and includes an inclined surface. The width of a contact surface formed on the head of the terminal metal fitting 12 may narrow down toward the outer end of the head, such that the outer end is formed as a pointed end. If the outer end of the head includes such an inclined surface (or a pointed end surface), the terminal metal fitting 12 inserted in the channel of the hat stringer can be readily pulled out and removed from the channel. Of course, the shape of the outer end is not limited to such a shape. The specific shape of the terminal metal fitting 12 is not limited to the above-described configuration that includes the insert and the head. The terminal metal fitting 12 may include other configurational features.

As shown in FIG. 1A and FIG. 2A, one opening of the pressurization hole 12a is formed in an exposed surface of the head of the terminal metal fitting 12, and the other opening of the pressurization hole 12a is formed in an end surface of the insert. From the one opening formed in the exposed surface of the head, the pressurization hole 12a extends into the head substantially perpendicularly to the exposed surface of the head, bends at substantially the center of the head toward the insert, and connects to the opening formed in the end surface of the insert. Accordingly, in a state where the bladder 10 is inserted in the channel of the hat stringer, the one opening of the pressurization hole 12a is exposed at the exposed surface of the head of the terminal metal fitting 12, and the other opening is connected to the hollow space of the body 11. Therefore, the pressurization hole 12a serves as an air passage connecting between the inside and outside of the body 11, and makes it possible to pressurize the inside of the body 11, which is sealed air-tight. For example, in a high-pressure environment in an autoclave, the internal pressure of the body 11 becomes also high through the pressurization hole 12a. Consequently, the inside of the body 11, which is sealed air-tight, is pressurized and thereby the body 11 is inflated.

In the exemplary embodiment, aluminum or an aluminum alloy is used as the material of the terminal metal fitting 12. However, the material of the terminal metal fitting 12 is not limited to aluminum or an aluminum alloy. Since the bladder 10 is used as a jig, the terminal metal fitting 12 is preferably made of a material having a smallest possible weight. In addition, since the pressurization hole 12a is formed in the terminal metal fitting 12, the terminal metal fitting 12 is preferably made of a material that is readily processable and excellent in terms of maintaining the shape of a hole formed therein. For these reasons, and also in light of cost, aluminum or an aluminum alloy is suitably used in the exemplary embodiment. Depending on the manufacturing conditions of the composite material structure, conditions other than "being lightweight" may be considered as more important. Therefore, for example, a known metal material other than aluminum, a ceramic material, or a heat resistant resin composition may be selected. Alternatively, a composite material may be used, which may be any combination of the following: various metals, ceramics, and heat resistant resin compositions.

The terminal plug 13 is a component that seals the other end portion of the body 11 in an air-tight manner (the other end portion is positioned on the opposite side of the body 11 from the one end portion sealed by the terminal metal fitting 12). In the exemplary embodiment, as shown in FIG. 2A, the terminal plug 13 includes an insert and an outer cap. The insert is to be inserted into the hollow space of the body 11. The outer cap is connected to the insert.

Similar to the insert of the terminal metal fitting 12, the insert of the terminal plug 13 has a short pillar-like shape whose transverse sectional is trapezoidal to conform to the transverse sectional shape of the hollow space of the body 11. The outer cap has a plate shape whose external diameter is substantially the same as the external diameter of the body 11. The length of the insert is not particularly limited. Similar to the insert of the terminal metal fitting 12, the insert of the terminal plug 13 may have such a length that in a state where the insert is inserted in the hollow space of the body 11 and adhered to the inner surface of the body 11 by the adhesive, the length ensures a sufficient adhesion area so that the inside of the body 11 can be kept air-tight.

The specific shape of the terminal plug 13 and the dimensions of each portion of the terminal plug 13 are not limited to the above-described configuration. For example, the terminal plug 13 may include other configurational features in addition to the insert and the outer cap as necessary. The outer cap need not be plate-shaped, so long as the inside of the body 11 can be sealed with the outer cap in an air-tight manner. For example, a metal may be used as the material of the terminal plug 13 as with the case of the terminal metal fitting 12. However, preferably, an elastic material is used as the material of the terminal plug 13. The reasons for this include the following: unlike the terminal metal fitting 12, it is not necessary for the terminal plug 13 to stably maintain the pressure; and after the bladder 10 is inserted and used in the channel of the hat stringer, when the bladder 10 is pulled out and removed from the channel, the terminal plug 13 is the rear end of the bladder 10.

The elastic material of the terminal plug 13 is not particularly limited to a specific kind. A heat resistant elastic material having such flexibility as to be able to keep the inside of the body 11 air-tight may be adopted. The same elastic material as that of the tubular portion 14 of the body 11 can be used as the elastic material of the terminal plug 13. Both the tubular portion 14 and the terminal plug 13 may be molded from the elastic material of the same composition. Alternatively, the tubular portion 14 and the terminal plug 13 may be molded from respective elastic materials having different compositions from each other, because the required physical property of the tubular portion 14 and the required physical property of the terminal plug 13 are different from each other (e.g., it is important for the tubular portion 14 to have high inflatability while the terminal plug 13 is not required to have as high inflatability as the tubular portion 14).

As previously described, in the exemplary embodiment, the body 11 is sealed by the two sealing components, which are the terminal metal fitting 12 and the terminal plug 13. Of course, the manner of sealing the body 11 is not thus limited. As one alternative, the body 11 may be sealed by two sealing components that are both made of a resin composition. As another alternative, the tubular body 11 may be subjected to secondary molding, and thereby both the end openings of the tubular body 11 may be sealed without using the additional sealing components. Whichever sealing technique may be adopted, so long as the stable pressurization hole 12a is formed in one of the end portions of the tubular body 11.

In the exemplary embodiment, the outer peripheral surface of the tubular portion 14 may be coated with the outer peripheral film 15, and the inner peripheral surface of the tubular portion 14 is coated with the inner peripheral film 16. Each of the outer peripheral film 15 and the inner peripheral film 16 may have a tubular shape with no joint. Alternatively, each of the outer peripheral film 15 and the inner peripheral film 16 may be a sheet-shaped film with which to coat the outer peripheral surface or the inner peripheral surface, i.e., each of the outer peripheral film 15 and the inner peripheral film 16 may be configured to include a joint. In particular, since the inner peripheral film 16 serves as a gas barrier layer, the absence of the joint allows the inner peripheral film 16 to exert its gas barrier capability favorably. However, even in a case where the inner peripheral film 16 includes a joint, lowering of the gas barrier capability of the inner peripheral film 16 can be prevented.

In a case where the outer peripheral film 15 or the inner peripheral film 16 includes a joint, the joint is preferably positioned at the contact wall 11a, which corresponds to the upper base of the trapezoid of the transverse section. Generally speaking, while the bladder is not in use, the bladder is placed such that the exposed wall 11b corresponding to the lower base of the trapezoid faces downward. Therefore, the outer peripheral film 15 or the inner peripheral film 16 positioned at the exposed wall 11b side tends to peel off more easily. On the other hand, when the bladder is placed as above, since the contact wall 11a corresponding to the upper base faces upward, the contact wall 11a is less affected by the placement, and the joint positioned at the contact wall 11a is also less affected by the placement.

In a conventional bladder, in order to improve the removability thereof, the outer peripheral surface of the body 11 is coated with the outer peripheral film 15, and the outer peripheral film 15 has a certain degree of gas barrier capability. However, when such a conventional bladder is actually used in the manufacturing of a composite material structure, even if the tubular body has a sufficient thickness and the outer peripheral surface thereof is coated with the outer peripheral film 15 having gas barrier capability, a certain amount of autoclave gas inevitably leaks from the body 11. Therefore, conventionally, by coating the body with a degassing material such as a degassing film, the leaked autoclave gas is evacuated in the longitudinal direction of the bladder.

In this respect, in the present disclosure, not the outer peripheral surface but the inner peripheral surface of the body 11 is coated with the inner peripheral film 16, which serves as a gas barrier layer. In this case, higher gas barrier capability can be realized than in a case where the outer peripheral surface is provided with gas barrier capability. It is common general technical knowledge that, normally, the gas barrier capability of the outside of the body 11 is increased in order to improve the gas barrier capability of the body 11. Conventionally, considering the inflation during the autoclaving, it has not been an option to form a gas barrier layer on the inner surface of the body 11. However, as a result of diligent studies by the inventors of the application invention, it has been newly found that, since the outer peripheral film is likely to be damaged from the outside, by coating the inner peripheral surface with a gas barrier layer, the gas barrier capability of the body 11 can be improved without substantially affecting the performance of the bladder 10 as a jig.

[Materials of Composite Material Structure Manufacturing Jig]

Next, materials used for the tubular portion 14, the outer peripheral film 15, the inner peripheral film 16, and the fiber-reinforced material 21, which are included in the body 11, are described specifically. In addition, a method of manufacturing the body 11 is also described specifically. Further, a method of manufacturing the bladder 10 is also described.

In the bladder 10 according to the exemplary embodiment, at least the tubular portion 14, which is the "main portion" of the body 11, is made of an elastic material. Since the tubular portion 14 needs to be inflatable by internal pressurization, the tubular portion 14 is preferably formed of a material that has excellent elasticity although the tubular portion 14 may be formed of a general elastic material. Therefore, a heat resistant rubber composition is suitably used as the material of the tubular portion 14.

As previously described, a known silicone rubber composition is a preferable example of the heat resistant rubber composition. A fluororubber composition is another preferable example of the heat resistant rubber composition. The base polymer of each of these rubber compositions is an elastomer resin having a heat resistance limit temperature of about 230° C. and a safe heat resistance temperature of about 180° C. or higher. Therefore, these rubber compositions are particularly preferable materials for the bladder 10, which is used as a jig in a high-temperature and high-pressure environment.

Each of these rubber compositions is obtained in the following manner: an uncrosslinked rubber precursor composition whose base polymer is blended with additive agents such as a curing agent and a pigment is heated and pressurized, and thereby cross-linked. For example, the surface hardness of the tubular portion 14 is a surface hardness measured by a JIS K6253 durometer type A spring type hardness test, and is preferably within the range of, for example, 50 to 85. Therefore, in the rubber precursor composition, the components are blended so as to realize this surface hardness.

The chemical composition of a silicone rubber precursor composition serving as the rubber precursor composition is not particularly limited. Examples of the base polymer of the silicone rubber precursor composition include polydimethyl silicone rubber (MQ), methyl vinyl silicone rubber (VMQ), methyl phenyl silicone rubber (PMQ), and fluorosilicone rubber (FVMQ). Examples of the curing agent include an organic peroxide, such as alkyl organic peroxide. The silicone rubber precursor composition may be further blended with other additive agents, such as a reinforcement material (silica), a pigment, and an internal mold release agent.

The chemical composition of a fluororubber precursor composition serving as the rubber precursor composition is also not particularly limited. Examples of a fluorocarbon resin serving as the base polymer of the fluororubber precursor composition include polyvinylidene fluoride, tetrafluoroethylene-propylene copolymer, and tetrafluoroethylene-perfluorovinyl ether copolymer. The curing agent and the other additive agents to be blended in the fluororubber precursor composition are the same as those mentioned above.

The outer peripheral film 15, which is the outer surface layer of the body 11, is mainly used for providing favorable slidability when pulling out and removing the bladder 10 from the channel of the hat stringer after the composite material structure is manufactured. Therefore, particularly preferably, the material of the outer peripheral film 15 has low tackiness. In the exemplary embodiment, a fluorocarbon resin composition is particularly preferably used as the material of the outer peripheral film 15.

Examples of the fluorocarbon resin composition include polytetrafluoroethylene (PTFE), tetrafluoroethylene-ethylene copolymer (ETFE), tetrafluoroethylene-perfluoroalkyl vinyl ether copolymer (PFA), and tetrafluoroethylene-hexafluoropropylene copolymer (FEP). In the exemplary embodiment, a film formed of polytetrafluoroethylene (PTFE) is used.

For example, the fiber-reinforced material 21, which is included in the body 11 together with the elastic material, is a cloth that is, for example, a braid cloth, a woven fabric cloth, a knitted cloth, or a non-woven fabric cloth. The fiber-reinforced material 21 is not limited to a cloth, but may be, for example, filament fibers. The fiber-reinforced material 21 may be configured such that it does not prevent the inflation of the body 11 when the body 11 is pressurized during autoclaving. In a case where the fiber-reinforced material 21 is a cloth, a slit may be formed in the cloth along the longitudinal direction as necessary. A fibrous material used as the fiber-reinforced material 21 is not particularly limited. Examples of the fibrous material include aramid fibers, nylon fibers, polyester fibers, glass fibers, and carbon fibers. Typically, it is preferable to use a cloth made of glass fibers (i.e., a glass cloth). Among these, a plurality of kinds of fibrous materials may be used in combination.

The inner peripheral film 16, which is the inner surface layer of the body 11, is a gas barrier layer used for suppressing the leakage of autoclave gas (high-temperature and high-pressure gas) from the inside of the body 11. Therefore, the material of the inner peripheral film 16 may be a material that can exert gas barrier capability even under the high-temperature and high-pressure condition during the autoclaving.

Specific examples of the material of the inner peripheral film 16 include a fluorocarbon resin film, a polyether ether ketone (PEEK) film, a polyimide film, a polyamide film, and a polyester film. In a case where the inner peripheral film 16 is a fluorocarbon resin film, more preferable examples of the material of the inner peripheral film 16 include a polytetrafluoroethylene (PTFE) film and a tetrafluoroethylene-ethylene copolymer (FTFE) film. In a case where the inner peripheral film 16 is a polyamide film, more preferable examples of the material of the inner peripheral film 16 include an aromatic polyamide film. In a case where the inner peripheral film 16 is a polyester film, more preferable examples of the material of the inner peripheral film 16 include a polyethylene naphthalate (PEN) film.

The thickness of each of the tubular portion 14, the outer peripheral film 15, and the inner peripheral film 16 included in the body 11 is not particularly limited. The thickness of the tubular portion 14 may be suitably selected from a thickness range adopted by a known bladder 10 while taking into account, for example, the inflation during the autoclaving and the flexibility at the time of removal. The thickness of the outer peripheral film 15 may be set so that, as previously mentioned, favorable slidability can be exerted at the time of removal, and also, sufficient durability for preventing breakage at the time of removal can be obtained. The thickness of the inner peripheral film 16 may be set so that, as previously mentioned, the autoclave gas can be suppressed or prevented from leaking from the body 11 during the autoclaving.

EXAMPLE OF MANUFACTURING COMPOSITE MATERIAL STRUCTURE MANUFACTURING JIG

Next, one example of a representative method of manufacturing the bladder 10, which is one example of the composite material structure manufacturing jig according to the present disclosure, is specifically described with reference to FIG. 3A to FIG. 3C, particularly focusing on molding (manufacturing) of the body 11.

The body 11 may be manufactured by using any method known in the field of resin molding. Particularly in a case where the body 11 includes at least the tubular portion 14, the outer peripheral film 15, the inner peripheral film 16, and the fiber-reinforced material 21, the body 11 may be manufactured by using a mold (metal mold) as shown in FIG. 3A to FIG. 3C. As schematically shown in FIG. 3A, for example, the mold for molding the body 11 includes at least an upper mold 31 and a lower mold 32. A cavity 32a corresponding to the body 11 is formed in the lower mold 32. The cavity 32a is channel-shaped conforming to the outer shape of the body 11. Specifically, the cavity 32a extends in one direction, and the transverse section thereof has an inverted trapezoidal shape (i.e., a trapezoidal shape with the lower base facing upward and the upper base facing downward).

Figure 3A:
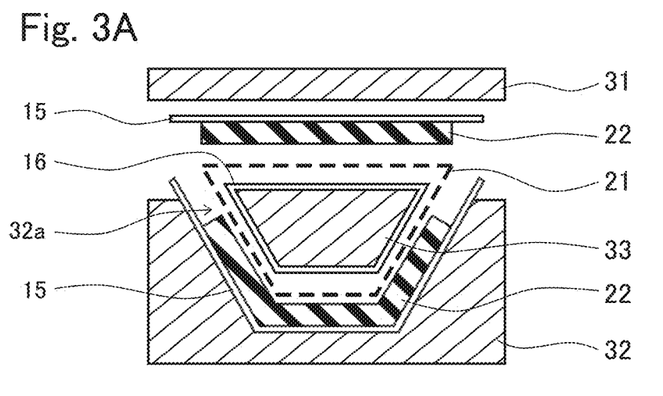
FIG. 3A to FIG. 3C are schematic process drawings showing one example of a process of manufacturing the body of the bladder shown in FIG. 1.

First, as shown in FIG. 3A, for example, the outer peripheral film 15 is placed such that the outer peripheral film 15 covers the entire inner surface of the cavity 32a of the lower mold 32 and extends to the upper surface of the lower mold 32. A plate-shaped material 22 made of the rubber precursor composition is placed on the outer peripheral film 15 in a manner to conform to the shape of the cavity 32a. At the time, preferably, a contact surface (upper surface) of the outer peripheral film 15, the contact surface contacting the plate-shaped material 22, has already been subjected to any of various surface treatments for increasing the adhesiveness of the contact surface.

A specific surface treatment technique to be adopted is not particularly limited. Examples of the surface treatment technique include alkali treatment using a basic solution such as a sodium hydroxide solution, corona discharge treatment, etc. If the rubber precursor composition is a silicone rubber precursor composition, one preferable example of the surface treatment technique in light of long-lasting adhesiveness is alkali treatment.

As shown in FIG. 3A, in order to form the hollow space of the tubular portion 14, a core metal 33 serving as a core box is prepared, and the inner peripheral film 16 is wound around the outer periphery of the core metal 33. Then, the fiber-reinforced material 21 (represented by dashed line in the drawing) is placed outside the core metal 33, around which the inner peripheral film 16 is wound, such that the fiber-reinforced material 21 is wound around the outer periphery of the core metal 33, which is then placed on the upper surface of the rubber precursor composition plate-shaped material 22 placed on the lower mold 32. In this manner, the core metal 33 is accommodated in the cavity 32a of the lower mold 32. At the time, preferably, a contact surface (outer surface) of the inner peripheral film 16, the contact surface contacting the plate-shaped material 22, has already been subjected to the same surface treatment as that performed on the outer peripheral film 15. The fiber-reinforced material 21 may also be subjected to known adhesive treatment to improve the adhesiveness of the fiber-reinforced material 21 to the plate-shaped material 22.

In the present disclosure, at the time of placing the core metal 33, the fiber-reinforced material 21 (reinforcement fibers), and the rubber precursor composition plate-shaped material 22 (the elastic material) in the cavity 32a such that the fiber-reinforced material 21 (the reinforcement fibers) and the rubber precursor composition plate-shaped material 22 (the elastic material) are disposed around the core metal 33, preferably, the fiber-reinforced material 21 either includes a slit therein that extends along the longitudinal direction of the body 11, or is sandwiched between pieces of the elastic material. In a case where the fiber-reinforced material 21 includes a slit therein that extends along the longitudinal direction, the elastic material (the heat resistant rubber composition) that has melted can be readily impregnated into the fiber-reinforced material 21. Alternatively, also in a case where the fiber-reinforced material 21 is sandwiched between pieces of the elastic material (e.g., between plate-shaped materials 22), the pieces of the elastic material (the heat resistant rubber composition) that have melted can be readily impregnated into the fiber-reinforced material 21.

In FIG. 3A, each of the inner peripheral film 16 and the fiber-reinforced material 21 has a tubular shape extending in the longitudinal direction. However, each of the inner peripheral film 16 and the fiber-reinforced material 21 to be wound around need not be tubular, but may be sheet-shaped. In particular, in a case where the inner peripheral film 16 is tubular, the inner peripheral surface of the body 11 of the obtained bladder 10 is coated with the inner peripheral film 16 (the gas barrier layer), with no joint formed at the inner peripheral surface of the body 11. This makes it possible to further improve the gas barrier capability of the inner peripheral film 16. Alternatively, in a case where the inner peripheral film 16 is a sheet-shaped film, even though a joint is formed in this case, leakage of the autoclave gas through the joint can be prevented, for example, by making the ends of the inner peripheral film 16 overlap each other.

Then, as shown in FIG. 3A, the rubber precursor composition plate-shaped material 22 is placed on the upper side of the core metal 33, and the outer peripheral film 15 is further placed thereon. In this state, accommodated in the cavity 32a of the lower mold 32 are the lowermost outer peripheral film 15, the lower rubber precursor composition plate-shaped material 22, the fiber-reinforced material 21, the core metal 33 covered with the inner peripheral film 16, the upper rubber precursor composition plate-shaped material 22, and the upper outer peripheral film 15, which are sequentially stacked in this order. The arrangement of the rubber precursor composition in the cavity 32a is not limited to arranging the plate-shaped material 22 at both the upper and lower sides. Alternatively, the rubber precursor composition not in a plate shape but in a different shape may be placed in a manner to conform to the sectional shape of the body 11. Partial topping of the rubber precursor composition may be adopted. Alternatively, the fiber-reinforced material 21 may be sandwiched between pieces of the rubber precursor composition.

Figure 3B:
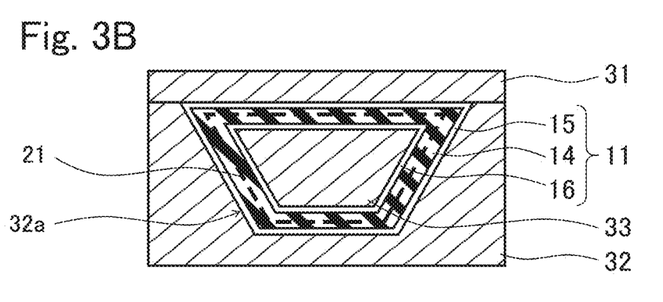

Next, as shown in FIG. 3B, the upper mold 31 and lower mold 32 are subjected to mold clamping by an unshown mold clamp, and retained under predetermined molding conditions (e.g., a predetermined temperature range, mold clamping pressure, retention time, etc.). As a result, the plate-shaped materials 22 melt and turn into a fluid of the rubber precursor composition. The rubber precursor composition fluid spreads within the cavity 32*a*, and is impregnated into the fiber-reinforced material 21. The rubber precursor composition fluid is cured due to progression of a crosslinking reaction, and thereby the tubular portion 14 is formed, which is made of the heat resistant rubber composition (the elastic material) reinforced by the fiber-reinforced material 21. Further, the outer peripheral films 15 closely adhere to the outer surface of the tubular portion 14, and are integrated with the tubular portion 14. Also, the inner peripheral film 16 closely adheres to the inner surface of the tubular portion 14, and is integrated with the tubular portion 14.

Figure 3C:
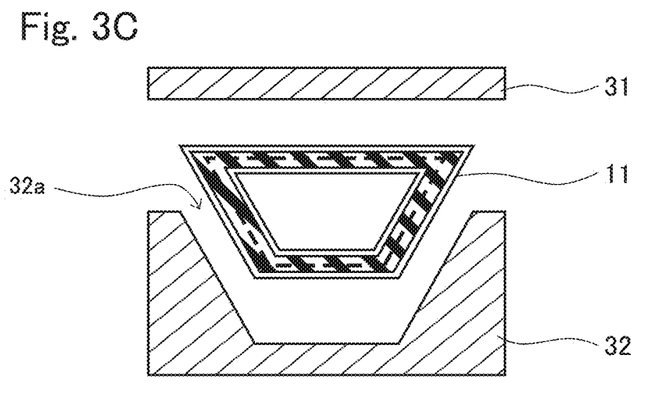

Thereafter, as shown in FIG. 3C, the mold clamp is released and the upper mold 31 is opened. A molded product of the body 11 is removed from the cavity 32*a*, and the core metal 33 is pulled out and removed from the molded product. Thereafter, the burr is removed from the molded product to trim the outer shape thereof, and thus the body 11 is formed. As shown in FIG. 3C, the body 11 includes: the tubular portion 14 including at least the fiber-reinforced material 21 and the elastic material; the outer peripheral film 15, with which the outer peripheral surface of the tubular portion 14 is coated; and the inner peripheral film 16, with which the inner peripheral surface of the tubular portion 14 is coated.

Next, the terminal metal fitting 12 and the terminal plug 13 serving as sealing components are attached to both ends of the molded body 11. For example, a known heat resistant adhesive used for a heat resistant rubber composition is applied to the insert of the terminal metal fitting 12 and the insert of the terminal plug 13, and these inserts are inserted into the respective end portions of the body 11. Thereafter, the adhesive is cured, and thereby the body 11 is sealed air-tight. In this manner, the bladder 10 according to the exemplary embodiment is manufactured.

Various conditions, auxiliary materials such as adhesives, etc., to be adopted in the manufacturing process are not particularly limited. Known conditions or materials in the field of bladders can be suitably used. For example, one representative example of a method of manufacturing a bladder is described in the previously mentioned Patent Literatures 1 to 3. Therefore, the bladder 10 according to the present disclosure can be manufactured not only in accordance with the above-described manufacturing method example, but also with reference to these known literatures.

The inventors of the present application have found as a result of their diligent studies that when the body 11 is molded by using the above-described upper mold 31 and lower mold 32, the fiber-reinforced material 21 is not sufficiently contained within the walls near the lower base corners of the trapezoidal transverse section, that is, near the outer ends of the exposed wall 11*b* corresponding to the lower base, i.e., near the contact surfaces between the upper mold 31 and the lower mold 32, and the fiber-reinforced material 21 partly protrudes to the outside of the walls, or even if the fiber-reinforced material 21 does not protrude to the outside of the walls, the fiber-reinforced material 21 is present extremely locally near the outside of the walls (i.e., present adjacently to the outer peripheral surfaces of the walls).

When the fiber-reinforced material 21 is partly exposed from the walls, the autoclave gas tends to leak from a part of the walls, from which part the fiber-reinforced material 21 is exposed. Even in a case where the fiber-reinforced material 21 is not exposed from the walls, if a part of the fiber-reinforced material 21 is positioned too close to the outside of the walls, then after repeated use of the bladder 10, in which the body 11 is repeatedly inflated by autoclaving, cracks occur in the part of the fiber-reinforced material 21, the part being positioned too close to the outside of the walls. Consequently, the autoclave gas tends to leak through the cracks.

In a conventional bladder, as previously described, in order to improve the removability of the bladder, the outer peripheral surface of the body 11 is coated with the outer peripheral film 15, and the outer peripheral film 15 has a certain degree of gas barrier capability. However, if the fiber-reinforced material 21 is exposed near the outer ends of the exposed wall 11*b*, almost none of the leakage of the autoclave gas can be suppressed by the outer peripheral film 15. In this respect, in a case where the inner peripheral surface is coated with the inner peripheral film 16 serving as a gas barrier layer as in the present disclosure, even if the fiber-reinforced material 21 is exposed, the leakage of the autoclave gas can be sufficiently suppressed by the inner peripheral surface of the body 11. This makes it possible to effectively suppress or avoid the leakage of the autoclave gas from a part of the walls, from which part the fiber-reinforced material 21 is exposed.

In the exemplary embodiment, as described above, the inner peripheral film 16 serving as a gas barrier layer is wound around the outer peripheral surface of the core metal 33 serving as a core. The rubber precursor composition (the elastic material) is heated such that the rubber precursor composition is melted and impregnated into the reinforcement fibers, and thereby the body 11 is molded. Thereafter, the core metal 33 (the core) is pulled out and removed from the body 11. Accordingly, the inner peripheral film 16 serving as the gas barrier layer of the body 11 can provide slidability when the core metal 33 is pulled out and removed in the manufacturing process. Therefore, in this case, the removal of the core metal 33 can be performed more readily than in the conventional art. Thus, with the inner peripheral film 16, not only can the gas barrier capability of the body 11 be improved, but also the productivity of the bladder 10 can be improved.

[Variations]

Figure 4A:
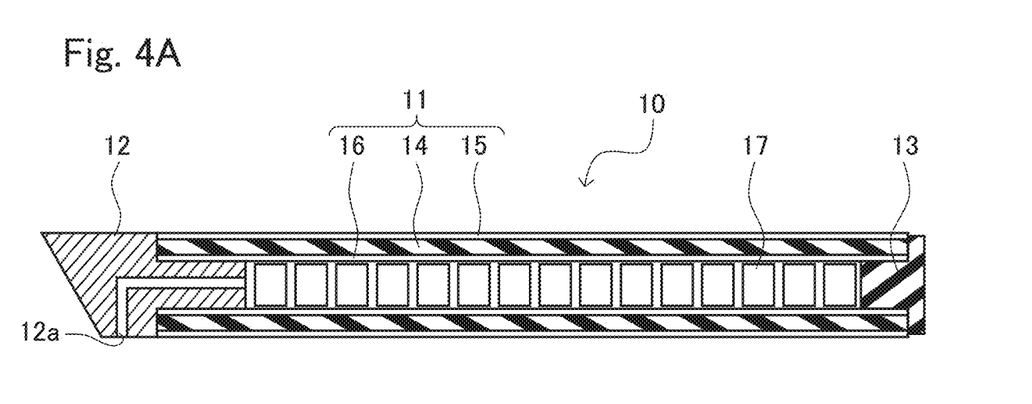
FIG. 4A is a schematic sectional view showing a longitudinal section of the bladder according to a variation of the present disclosure.
Figure 4B:
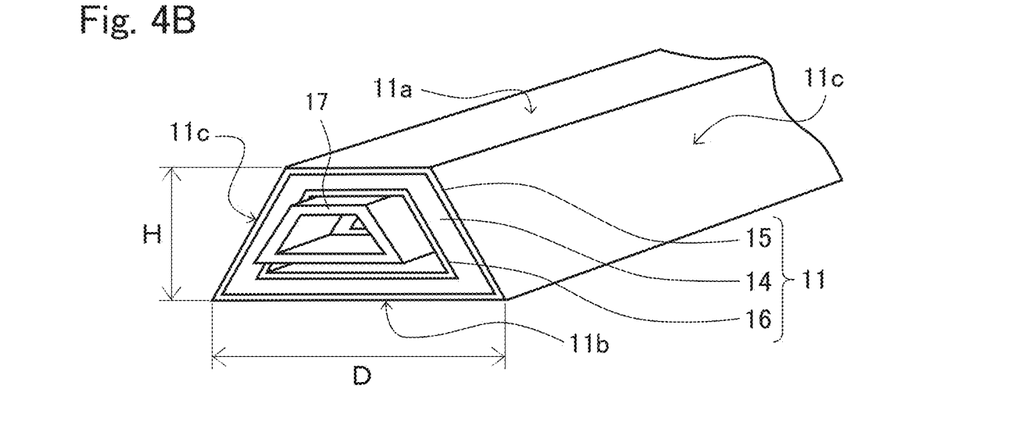
FIG. 4B is a partial perspective view showing one end of the body of the bladder shown in FIG. 4A.
Figure 4C:
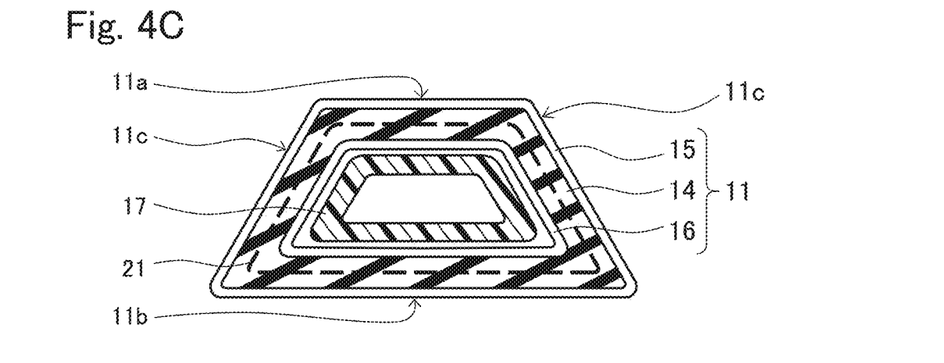
FIG. 4C is a schematic sectional view showing a cross section in a direction orthogonal to the longitudinal direction of the bladder shown in FIG. 4A.

The bladder 10 as the composite material structure manufacturing jig according to the present disclosure is not limited to the configuration of the above-described present embodiment, so long as the inner surface of the trapezoidal body 11 is coated with a gas barrier layer. As one variation of the bladder 10 according to the present disclosure, for example, FIG. 4A to FIG. 4C show a configuration in which a reinforcement structure 17 is disposed inside the body 11. The reinforcement structure 17 suppresses deformation of the body 11 due to pressing from the outside of the body 11.

The reinforcement structure 17 has a shape extending along the longitudinal direction of the body 11. The reinforcement structure 17 is either divided into pieces in the longitudinal direction, or provided with slits formed in a direction crossing the longitudinal direction (e.g., in the transverse direction). Except the reinforcement structure 17, the configuration of the bladder 10 shown in FIG. 4A to FIG. 4C is substantially the same as the configuration shown in FIG. 2A to FIG. 2C. Therefore, the description of the common configuration is omitted.

As previously described, the body 11 is made of the elastic material, such as a heat resistant rubber composition. Therefore, even though the body 11 is reinforced by the fiber-reinforced material 21, there is a case where the exposed wall 11b of the body 11 becomes warped at the time of lamination of the prepreg that forms the skin. In this case, the prepreg cannot be laminated properly, and consequently the prepreg sinks inward of the body 11. In order to laminate the prepreg while avoiding the sinking thereof, the pressure and speed of the prepreg lamination by a laminator cannot be made high. Therefore, it has been difficult to improve the productivity.

In this respect, if the reinforcement structure 17 extending along the longitudinal direction is provided inside the body 11 as shown in FIG. 4A to FIG. 4C, then at the time of prepreg lamination, the phenomenon in which the exposed wall 11b becomes warped and consequently the prepreg sinks can be suppressed effectively. As shown in FIG. 4A, the reinforcement structure 17 is, for example, provided with slits formed in the transverse direction. Therefore, the body 11 has sufficient flexibility in the longitudinal direction. For this reason, the bladder 10 including the reinforcement structure 17 can exert favorable followability to the skin. As a result, negative effects on the removal of the bladder 10 can be avoided effectively.

The reinforcement structure 17 may have the same shape as the internal shape of the body 11. Since the internal transverse sectional shape of the body 11 is also trapezoidal as shown in FIG. 4B and FIG. 4C, the transverse sectional shape of the reinforcement structure 17 may be a hollow trapezoidal shape. The reinforcement structure 17 need not be hollow. However, considering the properties such as followability and deformability, it is preferable that the reinforcement structure 17 be hollow.

Figure 5:
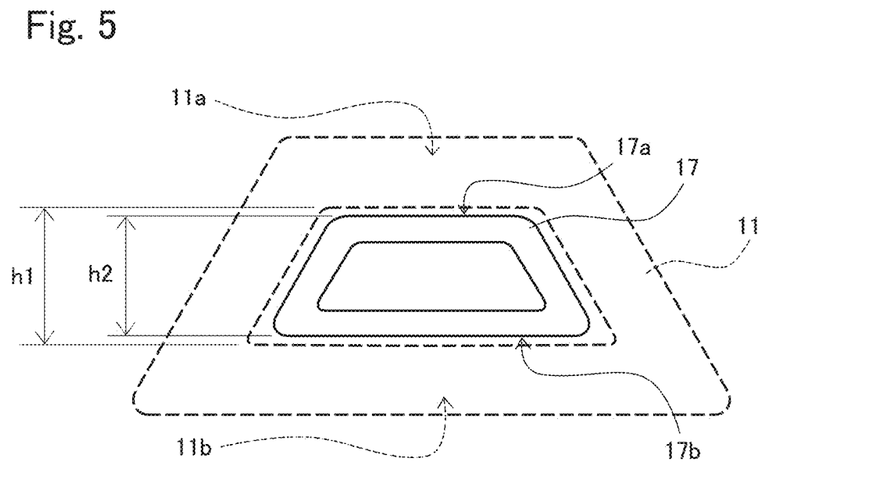
FIG. 5 is a schematic diagram showing one example of the dimensions of a reinforcement structure included in the bladder of the variation shown in FIG. 4A to FIG. 4C.

As shown in FIG. 5, the reinforcement structure 17 may be configured to include a lower-base-side outer surface 17b and an upper-base-side outer surface 17a. The upper-base-side outer surface 17a is positioned on the opposite side of the reinforcement structure 17 from the lower-base-side outer surface 17b. In a state where the reinforcement structure 17 is disposed inside the body 11, the lower-base-side outer surface 17b has a width corresponding to the inner surface of the lower base (the exposed wall 11b), and the upper-base-side outer surface 17a has a width corresponding to the inner surface of the upper base (the contact wall 11a). Here, in a case where the distance between the inner surface of the lower base and the inner surface of the upper base of the body 11 is defined as an "internal height h1 of the body 11" and the distance between the lower-base-side outer surface 17b and the upper-base-side outer surface 17a of the reinforcement structure 17 is defined as an "outer surface height h2 of the reinforcement structure 17," the relationship between h1 and h2 may be h1>h2 as shown in FIG. 5A. In the drawing of FIG. 5, the contour of the body 11 is simply indicated by dashed line for the sake of convenience of the description of the relationship between the internal height h1 of the body and the outer surface height h2 of the reinforcement structure 17.

As described above, in the present embodiment, the outer surface height h2 may be less than the internal height h1 such that, in a state where the upper-base-side outer surface 17a of the reinforcement structure 17 is in contact with the inner surface of the upper base (the contact wall 11a), the lower-base-side outer surface 17b is not in contact with the inner surface of the lower base (the exposed wall 11b), with a gap formed between the lower-base-side outer surface 17b and the inner surface of the lower base (the exposed wall 11b). In other words, the reinforcement structure 17 has a similar shape to the internal shape of the body 11; however, the reinforcement structure 17 may be in such a size that it does not contact the inner surfaces of the body 11 (i.e., the internal dimensions of the bladder 10 may be smaller than the external dimensions of the reinforcement structure 17).

In FIG. 5 (and FIG. 4B and FIG. 4C), similar to the transverse sectional shape of the internal space (hollow space) of the body 11, the transverse sectional shape of the reinforcement structure 17 is also trapezoidal. However, the transverse sectional shape of the reinforcement structure 17 is not limited to a trapezoidal shape. The reinforcement structure 17 may have a different transverse sectional shape, so long as the reinforcement structure 17 has a shape that includes the upper-base-side outer surface 17a and the lower-base-side outer surface 17b as previously described. If the transverse sectional shape of the reinforcement structure 17 is a trapezoidal shape, the shape of the hollow space of the body 11 can be kept to a proper shape. However, depending on, for example, use conditions of the bladder 10, it is possible that the followability or deformability of the body 11 can be further improved by using the reinforcement structure 17 having a transverse sectional shape different from a trapezoidal shape.

[Method of Using Bladder (Method of Manufacturing Composite Material Structure)]

Next, a representative method of using the bladder 10, which is the composite material structure manufacturing jig according to the present disclosure, i.e., one example of a method of manufacturing a composite material structure by using the bladder 10 according to the present disclosure, is specifically described with reference to FIG. 6A and FIG. 6B. For example, in the manufacturing of any of various composite material structures in which a hat stringer 41 shown in FIG. 6A is used as a frame component including a channel, the bladder 10 according to the present embodiment is suitably used as a jig for the hat stringer 41.

Figure 6A:
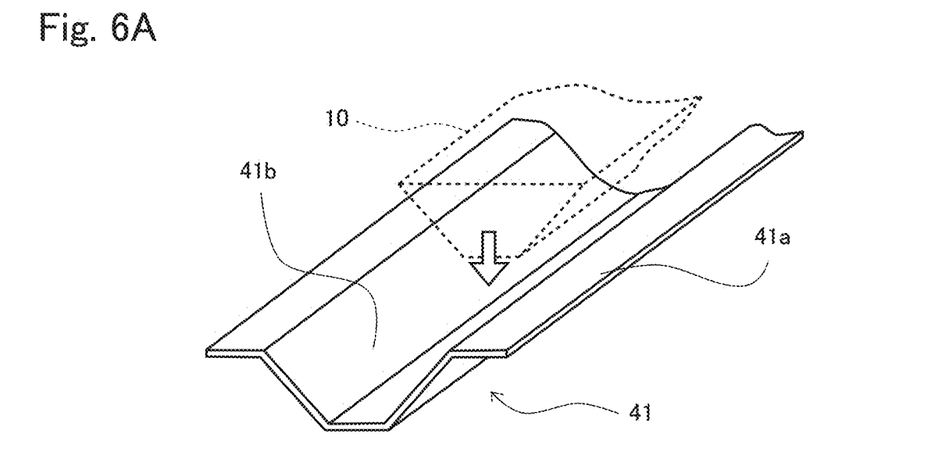
FIG. 6A is a partial perspective view showing one example of a hat stringer that is a representative frame component of a composite material structure according to an exemplary embodiment of the present disclosure.

As shown in FIG. 6A, the hat stringer 41 has a rod shape or elongated plate shape extending in one direction. The hat stringer 41 includes a pair of flat band-shaped portions 41a and a channel 41b. The flat band-shaped portions 41a extend in the longitudinal direction of the hat stringer 41, and are parallel to each other. The channel 41b is formed between the band-shaped portions 41a, and is recessed from the surfaces of the respective flat regions. FIG. 6A shows the channel 41b recessed downward. As schematically shown in FIG. 6A by dotted line, the bladder 10 is inserted in the channel 41b and used therein.

For example, in a case where the composite material structure is an aircraft fuselage, a mandrel that is a core jig for retaining the cylindrical shape of the fuselage is prepared. Channel-shaped recesses, to each of which the hat stringer 41 is to be attached, are formed in the outer peripheral surface of the mandrel. Accordingly, the hat stringer 41 is attached to one of the recesses. In this state, as shown in FIG. 6A, the hat stringer 41 is attached to the mandrel such that the channel 41b is exposed. The bladder 10 is inserted in the exposed channel 41b.

In such a state where the bladder 10 is inserted, prepreg is adhered to the outer surfaces of the band-shaped portions 41a of the hat stringer 41 and the outer surface of the exposed wall 11b of the bladder 10. In a case where the composite material structure is an aircraft fuselage as mentioned above, for example, by means of an automatic laminator equipped with a lamination roller, the prepreg is laminated and adhered to the outer surfaces while the mandrel is being rotated. During the prepreg lamination, the bladder 10 functions as a "backing strip" for the prepreg.

In a case where the body 11 of the bladder 10 is readily deformable due to the pressing by the lamination roller, a defect such as deformation may occur in the prepreg lamination. For example, when the exposed wall 11b of the bladder 10 is pressed by the lamination roller, the exposed wall 11b may be deformed in a manner to be recessed, which causes, for example, the following problems: deformation such as "undulation" occurs in the prepreg; the prepreg lamination position is shifted from the proper position; and the lamination pressure is lowered, and thereby layers of the prepreg do not closely adhere to each other and gaps are formed therebetween (i.e., voids in material).

In the bladder 10 of the variation as shown in FIG. 4A to FIG. 4C and FIG. 5, the reinforcement structure 17 is provided inside the body 11. This makes it possible to favorably suppress deformation of the bladder 10 even when the exposed wall 11b is pressed by the lamination roller. As a result, the occurrence of the above-described problems relating to the prepreg can be avoided.

Figure 6B:
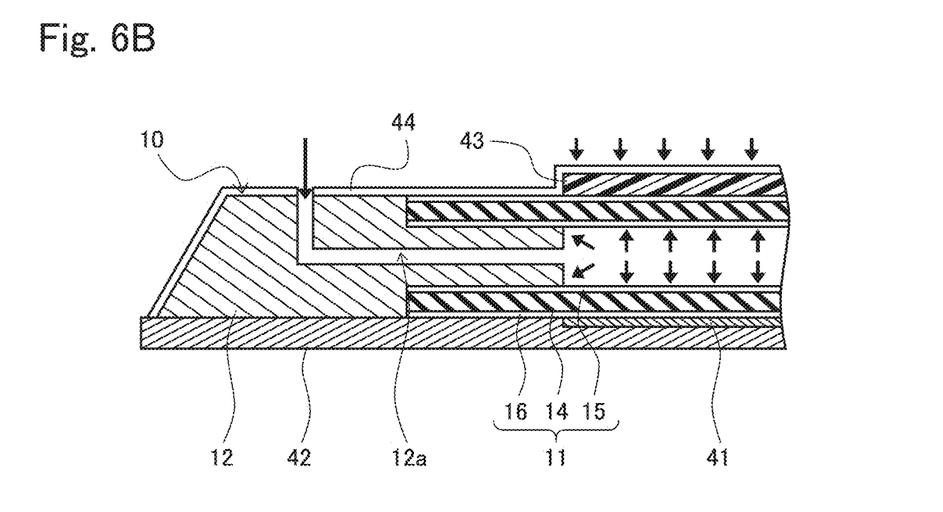
FIG. 6B is a schematic fragmentary sectional view showing one example of a state where the composite material structure is manufactured by inserting the bladder shown in FIGS. 1A and 1B into the hat stringer shown in FIG. 6A.

FIG. 6B shows one representative example of a state where the prepreg lamination is completed. FIG. 6B schematically shows the bladder 10 and the hat stringer 41 being mounted to the outer peripheral surface of the mandrel 42, around which prepreg 43 is wound. FIG. 6B schematically shows a sectional view of the bladder 10 around the terminal metal fitting 13. In particular, the mandrel 42 and the hat stringer 41 are schematically shown such that they are flat plate-shaped.

In a state where the prepreg 43 is thus laminated and adhered to the outer peripheral surface of the mandrel 42, as shown in FIG. 6B, the entire structure is covered with a bagging film 44 and accommodated in an autoclave. In the autoclave, the structure is heated at a predetermined temperature and pressurized at a predetermined pressure. At the time, as shown in FIG. 6B, the high-temperature and high-pressure atmosphere in the autoclave is transferred (as indicated by an arrow in the drawing) to the inside of the bladder 10 (i.e., the inside of the body 11, which is kept air-tight) through the pressurization hole 12a in the terminal metal fitting 12 of the bladder 10, and as a result, the pressure inside the bladder 10 increases, causing the body 11 to inflate.

At the time, the inner surface of the body 11, which is usually not provided with a gas barrier layer, is coated with the inner peripheral film 16, which serves as a gas barrier layer. Consequently, compared to a configuration in which only the outer surface of the body 11 is provided with a gas barrier layer (the outer peripheral film 15), the gas permeability of the body 11 can be greatly lowered as shown in FIG. 6B. Therefore, during the autoclaving, the autoclave gas (i.e., high-temperature and high-pressure gas) can be effectively suppressed from leaking to the outside from the inside of the body 11. For this reason, unlike the conventional art, a high-quality composite material structure can be manufactured without coating the components such as the bladder 10 with a degassing material.

Further, as shown in FIG. 6B, the high-temperature and high-pressure atmosphere in the autoclave is applied to the entire prepreg 43 via the bagging film 44 (as indicated by arrows in the drawing). As a result, curing of the prepreg 43 progresses in a state where the unshown band-shaped portions 41a of the hat stringer 41 are pressed against the prepreg 43 by strong external force. Then, when the curing is completed, a composite material structure is obtained. In the obtained composite material structure, a framework including the hat stringer 41, and the skin formed by the curing of the prepreg 43, are firmly and closely adhered to, and integrated with, each other.

A composite material structure manufacturing jig according to the present disclosure is used when manufacturing a composite material structure by adhering prepreg to a framework structure including a frame component that includes a channel extending along a longitudinal direction of the frame component. The composite material structure manufacturing jig is inserted in the channel of the frame component and used therein. The composite material structure manufacturing jig includes a tubular body formed of an elastic material containing a reinforcement fiber, the body including a trapezoidal transverse section that is a cross section orthogonal to a longitudinal direction of the body, the trapezoidal transverse section including an upper base and a lower base longer than the upper base. An inner surface of the body is coated with a gas barrier layer.

According to the above configuration, the inner surface of the body, which is usually not provided with a gas barrier layer, is coated with the gas barrier layer. Consequently, compared to a configuration in which the outer surface of the body is provided with the gas barrier layer, the gas permeability of the body can be greatly lowered. Therefore, during the autoclaving, the autoclave gas (i.e., high-temperature and high-pressure gas) can be effectively suppressed from leaking to the outside from the inside of the body. As a result, unlike the conventional art, a high-quality composite material structure can be manufactured without coating the jig with a degassing material. Consequently, the degassing material is made substantially unnecessary. Therefore, increase in the manufacturing cost can be suppressed sufficiently. Since the coating work is also made substantially unnecessary, the complexity of the manufacturing process can be reduced.

In the composite material structure manufacturing jig according to the present disclosure, the gas barrier layer may be a fluorocarbon resin film, a polyether ether ketone (PEEK) film, a polyimide film, a polyamide film, or a polyester film.

In the composite material structure manufacturing jig according to the present disclosure, the fluorocarbon resin film may be a polytetrafluoroethylene (PTFE) film or a tetrafluoroethylene-ethylene copolymer (FTFE) film. The polyamide film may be an aromatic polyamide film. The polyester film may be a polyethylene naphthalate (PEN) film.

The composite material structure manufacturing jig according to the present disclosure may include a reinforcement structure disposed inside the body, the reinforcement structure suppressing deformation of the body when the body is pressed from outside. The reinforcement structure may have a shape extending along the longitudinal direction of the body. The reinforcement structure may be either divided into pieces in the longitudinal direction, or provided with a slit formed in a direction crossing the longitudinal direction.

In the composite material structure manufacturing jig according to the present disclosure, the reinforcement structure may include a lower-base-side outer surface and an upper-base-side outer surface, the upper-base-side outer surface being positioned on an opposite side of the reinforcement structure from the lower-base-side outer surface, and in a state where the reinforcement structure is disposed inside the body, the lower-base-side outer surface may have a width corresponding to an inner surface of the lower base, and the upper-base-side outer surface may have a width corresponding to an inner surface of the upper base. In a case where a distance between the inner surface of the lower base and the inner surface of the upper base is defined as an internal height of the body and a distance between the lower-base-side outer surface and the upper-base-side outer surface of the reinforcement structure is defined as an outer surface height of the reinforcement structure, the outer surface height may be less than the internal height such that, in a state where the upper-base-side outer surface is in contact with the inner surface of the upper base, the lower-base-side outer surface is not in contact with the inner surface of the lower base, with a gap formed between the lower-base-side outer surface and the inner surface of the lower base.

A method of manufacturing the composite material structure manufacturing jig according to the present disclosure may use a mold and a core, the mold including a cavity corresponding to the body, the core being placed in the cavity and having a shape corresponding to an internal space of the body. The method may include: placing the core, the reinforcement fiber, and the elastic material in the cavity such that the reinforcement fiber and the elastic material are disposed around the core, the reinforcement fiber either including a slit therein that extends along the longitudinal direction of the body or being sandwiched between pieces of the elastic material; placing a film on an outer peripheral surface of the core such that the film is wound around the outer peripheral surface of the core, the film serving as a gas barrier layer; heating and melting the elastic material to impregnate the elastic material into the reinforcement fiber to mold the body; and then pulling out and removing the core from the body.

The above-described method makes it possible not only to manufacture the composite material structure manufacturing jig including the body whose inner surface is coated with the gas barrier layer, but also to readily impregnate the elastic material into the reinforcement fiber. In addition, the film serving as the gas barrier layer can provide the core with slidability at the time of removal of the core in the manufacturing process. Therefore, the removal of the core can be readily performed, which makes it possible to improve the productivity of the composite material structure manufacturing jig.

The present disclosure also encompasses a method of manufacturing a composite material structure by using the above-described composite material structure manufacturing jig. Specifically, the method of manufacturing a composite material structure according to the present disclosure may be a method of manufacturing a composite material structure in which a frame component including a channel is used, the method including: placing the frame component on an outer peripheral surface of a mold; inserting the above-described composite material structure manufacturing jig into the channel of the frame component; laminating prepreg on the composite material structure manufacturing jig and the frame component; and heating the prepreg to cure the prepreg.

From the foregoing description, numerous modifications and other embodiments of the present application are obvious to a person skilled in the art. Therefore, the foregoing description should be interpreted only as an example and is provided for the purpose of teaching the best mode for carrying out the present application to a person skilled in the art. The structural and/or functional details may be substantially modified without departing from the spirit of the present application.

INDUSTRIAL APPLICABILITY

The present application is widely and suitably applicable in the field of manufacturing a composite material structure in which a frame component including a channel, such as a hat stringer, is used.

The invention claimed is:

1. A method of manufacturing a composite material structure, the method comprising:
   placing a frame component including a channel on an outer peripheral surface of a mold;
   inserting a composite material structure manufacturing jig into the channel of the frame component, wherein
      the composite material structure manufacturing jig includes a tubular body formed of an elastic material containing a reinforcement fiber, the tubular body includes a trapezoidal transverse section that is a cross section orthogonal to a longitudinal direction of the tubular body, the trapezoidal transverse section includes an upper base and a lower base longer than the upper base, and an inner surface of the tubular body is coated with a gas barrier layer, and
      an interface between the gas barrier layer and the tubular body is treated by a surface treatment;
   laminating prepreg on the composite material structure manufacturing jig and the frame component; and
   curing the prepreg by heating the prepreg.

2. The method of manufacturing according to claim 1, wherein the gas barrier layer is a fluorocarbon resin film, a polyether ether ketone (PEEK) film, a polyimide film, a polyamide film, or a polyester film.

3. The method of manufacturing according to claim 2, wherein
   the fluorocarbon resin film is a polytetrafluoroethylene (PTFE) film or a tetrafluoroethylene-ethylene copolymer (FTFE) film,
   the polyamide film is an aromatic polyamide film, and
   the polyester film is a polyethylene naphthalate (PEN) film.

4. The method of manufacturing according to claim 1, wherein
   the composite material structure manufacturing jig further includes a reinforcement structure disposed inside the tubular body,
   the reinforcement structure is configured to suppress deformation of the tubular body when the tubular body is pressed from outside,
   the reinforcement structure has a shape extending along the longitudinal direction of the tubular body, and
   the reinforcement structure is either divided into pieces in the longitudinal direction, or provided with a slit formed in a direction crossing the longitudinal direction.

5. The method of manufacturing according to claim 4, wherein
   the reinforcement structure includes a lower-base-side outer surface and an upper-base-side outer surface,
   the upper-base-side outer surface is positioned opposite the lower-base-side outer surface,
   the reinforcement structure is disposed inside the tubular body so that the lower-base-side outer surface has a width corresponding to an inner surface of the lower base,
   the upper-base-side outer surface has a width corresponding to an inner surface of the upper base,
   an outer surface height of the reinforcement structure is less than an internal height of the tubular body,
   the internal height of the tubular body is a first distance between the inner surface of the lower base and the inner surface of the upper base,
   the outer surface height of the reinforcement structure is a second distance between the lower-base-side outer surface and the upper-base-side outer surface of the reinforcement structure, and in a state where the upper-base-side outer surface is in contact with the inner surface of the upper base, the lower-base-side outer surface is not in contact with the inner surface of the lower base such that there is a gap between the lower-base-side outer surface and the inner surface of the lower base.

6. The method of manufacturing according to claim 1, wherein the surface treatment is an alkali treatment.

7. The method of manufacturing according to claim 1, wherein the surface treatment is a corona discharge treatment.

* * * * *